United States Patent
Palm et al.

(10) Patent No.: US 11,565,940 B2
(45) Date of Patent: Jan. 31, 2023

(54) WHITE FUNCTIONAL ADDITIVES DERIVED FROM FILTRATION SPENT CAKE CONTAINING DIATOMITE

(71) Applicant: EP Minerals, LLC, Reno, NV (US)

(72) Inventors: Scott Kevin Palm, Reno, NV (US); Peter E. Lenz, Reno, NV (US); Andrew R. Welford, North Yorkshire (GB); George A. Nyamekye, Sparks, NV (US); Kara Linn Evanoff, Reno, NV (US)

(73) Assignee: EP Minerals, LLC, Reno, NV (US)

( * ) Notice: Subject to any disclaimer, the term of this patent is extended or adjusted under 35 U.S.C. 154(b) by 59 days.

(21) Appl. No.: 16/636,418

(22) PCT Filed: Aug. 4, 2017

(86) PCT No.: PCT/US2017/045557
§ 371 (c)(1),
(2) Date: Feb. 4, 2020

(87) PCT Pub. No.: WO2019/027473
PCT Pub. Date: Feb. 7, 2019

(65) Prior Publication Data
US 2020/0339428 A1    Oct. 29, 2020

(51) Int. Cl.
| | |
|---|---|
| *C08K 3/36* | (2006.01) |
| *C01B 33/12* | (2006.01) |
| *C09D 7/40* | (2018.01) |
| *C09D 7/61* | (2018.01) |

(52) U.S. Cl.
CPC ............. *C01B 33/124* (2013.01); *C08K 3/36* (2013.01); *C09D 7/61* (2018.01); *C09D 7/69* (2018.01); *C01P 2004/61* (2013.01); *C01P 2006/10* (2013.01); *C01P 2006/62* (2013.01); *C01P 2006/64* (2013.01); *C08K 2201/005* (2013.01)

(58) Field of Classification Search
CPC .. C01B 33/124; C08K 3/36; C08K 2201/005; C09D 7/61; C09D 7/69; C01P 2004/61; C01P 2006/10; C01P 2006/62; C01P 2006/64; B01J 20/28011; B01J 20/28016; B01J 20/14
USPC ........................................................ 524/448
See application file for complete search history.

(56) References Cited

U.S. PATENT DOCUMENTS

| | | | |
|---|---|---|---|
| 5,145,492 A | 9/1992 | Weiergräber | |
| 5,656,568 A * | 8/1997 | Shiuh ....................... | B01J 20/14 502/412 |
| 5,878,374 A | 3/1999 | Buchanan et al. | |
| 6,332,977 B1 | 12/2001 | Janecek | |
| 6,712,898 B2 | 3/2004 | Palm et al. | |
| 8,410,017 B2 * | 4/2013 | Nyamekye ........... | B01J 20/3078 502/412 |
| 9,433,918 B2 | 9/2016 | Riley | |
| 2011/0174732 A1 * | 7/2011 | Lu ............................ | B01J 20/14 210/639 |
| 2016/0059208 A1 * | 3/2016 | Wanene ................... | B01J 20/14 502/411 |

FOREIGN PATENT DOCUMENTS

| | | | |
|---|---|---|---|
| WO | 2016081509 A1 | 5/2016 | |
| WO | 2017040831 A1 | 3/2017 | |
| WO | 2017040837 A1 | 3/2017 | |

* cited by examiner

*Primary Examiner* — Hannah J Pak
(74) *Attorney, Agent, or Firm* — The Webb Law Firm

(57) ABSTRACT

This disclosure concerns flux-calcined products manufactured from filtration waste streams, and methods for manufacturing the same. In particular, it concerns functional additives produced from spent cake comprising diatomite filtration media which are suitable for use in paints, plastic films and elastomers for control of optical and surface properties, and processes which are suitable for manufacture of such products. It further concerns the recovery of energy from spent cakes during the regeneration process.

17 Claims, 2 Drawing Sheets

WHITE FUNCTIONAL ADDITIVES DERIVED FROM FILTRATION SPENT CAKE CONTAINING DIATOMITE

CROSS-REFERENCE TO RELATED APPLICATION

This application is a U.S. National-Stage entry under 35 U.S.C. § 371 based on International Application No. PCT/US2017/045557, filed Aug. 4, 2017, which was published under PCT Article 21(3) and which is hereby incorporated in its entirety by reference.

FIELD OF THE INVENTION

This disclosure relates to flux-calcined diatomite products manufactured from filtration waste streams, and methods for manufacturing the same. In particular, it concerns functional additives produced from spent cake comprising diatomite filtration media, and processes which are suitable for manufacture of such products. The disclosure further concerns the recovery of energy from spent cakes during the manufacturing process.

BACKGROUND

Diatomaceous earth (DE), also called diatomite or kieselgur, is a naturally-occurring sedimentary rock comprising primarily the skeletal remains (frustules) of diatoms, a type of single-celled plant generally found in stable bodies of water, such as oceans, seas and lakes. Diatomite has been used for many years in a variety of manufacturing processes and applications, including use as a filtration media, a carrier, an absorbent and as a functional additive.

In its earliest known use, diatomite was employed as a pigment in cave paintings in Europe that date back as far as 40,000 years ago. Modern industrial use of diatomite began in the mid to late 1800's and expanded early in the 20$^{th}$ century when it was discovered that the filtration properties of the material could be modified through thermal treatment.

The earliest uses of thermally modified diatomite occurred around 1913, and in these processes, the material was heated to its softening point to agglomerate the diatom frustules to form larger particles and to increase the permeability of the product. Although the main function of this process was to promote the agglomeration of the frustules, and it is therefore perhaps most appropriately called a sintering process, it has been almost exclusively referred to as calcining perhaps because it partially or fully dehydrates the diatomaceous earth.

About fifteen years after the introduction of calcined diatomite products, it was discovered that the properties of diatomite could be further modified through the addition of a flux during the calcining process. While various fluxes have been used since the introduction of flux-calcined diatomite, sodium-based fluxes, such as salt (sodium chloride) or soda ash (sodium carbonate, $Na_2CO_3$), have been the most commonly-used fluxes.

The two sintering processes now in common use in the diatomite industry are almost universally referred to as either straight-calcining, for a sintering process in which no flux is used, or flux-calcining, in which a flux is added to the diatomite to promote a lower softening temperature and more particle agglomeration. These processes produce different physical and optical changes in the diatomite product, including the following. Straight-calcining typically produces a change in the color of natural diatomite, from an off-white color to a pink or reddish color. This color change may be generally correlated with the iron content of the diatomite. Straight-calcining generally is effective in producing products with low to medium permeabilities in the range of about 0.1 to about 0.5 to 0.6 Darcy. Flux-calcining often changes the color of natural diatomite from off-white to a bright white color. Flux-calcining can lead to much greater agglomeration of particles, and is commonly used to produce products with permeabilities in the one Darcy to over ten Darcy permeability range, along with functional additives valued for their optical properties and particle morphology.

Products comprising straight-calcined or flux-calcined diatomite find widespread use in micro-filtration applications. They are primarily used in solid-liquid separations that are difficult due to inherent properties of entrained solids such as sliminess and compressibility. Such products are generally used in two modes: (1) as a pre-coat, wherein a layer of the product is established on a supporting surface which then serves as the solid-liquid separation interface; and (2) as body-feed, in which the product is introduced into the pre-filtered suspension to improve and maintain the permeability of separated and captured solids.

Products comprising straight-calcined diatomite, which are generally pink in color, are commonly used in polish filtration processes, in which fine particles are removed from a liquid. Industries that commonly use such products in polish filtration include the fermented beverage industry which utilizes products that comprise straight-calcined diatomite in the polish filtration of fermented beverages, such as beer and wine.

Products comprising flux-calcined diatomite can be very white in color and are used in filtration applications, as a precoat layer, to support products that contain straight-calcined diatomite, and alone for primary (coarser than polish) filtrations of fermented beverages, sweeteners, edible oil, lube oil, biodiesel, amino acids, antibiotics, lubricants, chemicals, and several other applications.

Products comprising flux-calcined diatomite are also extensively used as functional additives in coatings (e.g., paints), plastic films, and elastomers wherein optical and physical properties of these products are important in controlling the optical and surface properties of the coatings, plastic films, and elastomers. Functional additive products containing flux-calcined diatomite generally have a finer particle size distribution (P.S.D.) than products used in micro-filtration applications that contain flux-calcined diatomite since functional additive products are most often produced as by-products or co-products of flux-calcined filter aids. As such, the supply of these products is affected by the demand for flux-calcined filtration media, and, as a result, the supply of the functional additive products can be limited. Typical properties of flux-calcined diatomite functional additives which are used in coatings, plastic films, and elastomers for a diverse range of applications are shown in Table 1.

TABLE 1

Typical Properties of Exemplary Selected Flux-calcined Diatomite Functional Additives

| Product[1] | Celatom® MW-27 | Celite® 281 | Celatom® Celabrite® | Celite Super Floss | Celite 499 | Clarcel Dif D |
|---|---|---|---|---|---|---|
| P.S.D. | | | | | | |
| d10 (μm) | 8 | 7 | 6 | 3 | 6 | 7 |
| d50 (μm) | 15 | 17 | 11 | 8 | 15 | 18 |
| d90 (μm) | 33 | 35 | 20 | 20 | 31 | 42 |
| Wet Sieve +44 μm (%) | 0.9 | 0.7 | 0.0 | trace | 0.1 | 2.0 |
| Hegman Value [2] | 1.5 | 1.0 | 4.0 | 4.0 | 2.5 | 1.0 |
| Optical Properties | | | | | | |
| L* | 97.0 | 97.0 | 97.0 | 97.2 | 96.9 | 95.3 |
| a* | 0.0 | -0.2 | -0.1 | -0.3 | 0.0 | -0.3 |
| b* | 1.9 | 1.5 | 2.1 | 1.2 | 1.5 | 2.4 |
| Wet Bulk Density (g/ml) | 0.40 | 0.38 | 0.43 | 0.44 | 0.43 | 0.43 |
| GCOA (%) | 130 | 133 | 120 | 145 | 131 | 150 |
| Bulk Chemistry (XRF expressed as oxides) | | | | | | |
| $SiO_2$ (wt %) | 92.9 | 91.9 | 94.5 | 92.5 | 89.8 | 90.1 |
| $Al_2O_3$ (wt %) | 2.5 | 1.7 | 1.7 | 2.3 | 3.5 | 3.2 |
| CaO (wt %) | 0.3 | 0.4 | 0.4 | 0.3 | 0.6 | 0.6 |
| MgO (wt %) | 0.2 | 0.3 | 0.2 | 0.4 | 0.6 | 0.3 |
| $Na_2O$ (wt %) | 2.6 | 1.8 | 2.0 | 3.0 | 3.1 | 3.3 |
| $K_2O$ (wt %) | 0.1 | 0.1 | 0.1 | 0.2 | 0.2 | 0.2 |
| $Fe_2O_3$ (wt %) | 1.0 | 0.3 | 1.0 | 0.7 | 1.3 | 1.6 |
| $TiO_2$ (wt %) | 0.2 | 0.0 | 0.1 | 0.1 | 0.1 | 0.4 |

[1]Celatom products are made by EP Minerals, LLC. Celite products are made by Imerys. Clarcel products are made by Ceca.
[2] Hegman value of Celite 281 taken from product information sheet published by Imerys (2008). Other data generated by EP Minerals, LLC R & D Laboratory.

After use in filtration, filter aids that contain diatomite (or are diatomite) generally end up as part of a filtration waste stream called "spent cake" or "filter sludge". The filtration waste stream (spent cake) comprises the original filter aid (typically a filter aid that contains diatomite or is entirely diatomite), solids removed during filtration, and retained residual liquids. These spent cakes may contain both organic and inorganic particulates and liquids and, in some cases, possess a significant energy content. Spent cakes from filtration operations in which only flux-calcined diatomite products are used are generally off-white to very dark in color, depending on the liquid filtered and the content of the liquid. Some examples of the properties of selected spent cakes are shown in Table 2.

TABLE 2

Properties of Selected Spent Cakes

| Spent Cake Source | Corn Wet-Milling Source Tate & Lyle | Maltodextrin GPC[1] | Biodiesel REG[2] |
|---|---|---|---|
| Original Calorific Value (k-cal/kg) | 477 | 3960 | 5410 |
| Moisture Content (%) | 34.5 | 30.6 | 2.6 |
| Median Particle Size, d50 (μm) | 310 | 1700 | 124 |
| Optical Properties | | | |
| Y | 31.0 | 40.6 | 20.5 |
| L* | 62.5 | 69.9 | 52.4 |
| a* | -0.6 | -0.8 | 6.4 |
| b* | 7.1 | 9.3 | 23.6 |
| Bulk Chemistry (XRF results expressed as oxides, ignited basis) | | | |
| $SiO_2$ (wt %) | 88.0 | 87.1 | 91.6 |
| $Al_2O_3$ (wt %) | 4.0 | 3.8 | 2.7 |
| CaO (wt %) | 0.4 | 0.4 | 0.6 |
| MgO (wt %) | 0.2 | 0.2 | 0.3 |
| $Na_2O$ (wt %) | 4.3 | 5.0 | 2.8 |
| $K_2O$ (wt %) | 0.2 | 0.2 | 0.2 |
| $Fe_2O_3$ (wt %) | 2.0 | 2.0 | 1.5 |
| $TiO_2$ (wt %) | 0.3 | 0.2 | 0.1 |

[1]Grain Processing Corporation
[2]Renewable Energy Group Incorporated

Spent cake is often disposed of in landfills and other waste handling facilities, which, in some cases, increases the cost of using diatomite products in filtration. However, diatomite spent cake is often re-used in applications that differ from the original uses, such as ingredients in mulches or in animal feed.

Spent cake has also been processed for re-use as a filter aid. Janacek (U.S. Pat. No. 6,332,977) teaches a method whereby spent cake is sterilized via steam treatment, has contaminants removed in a wet process (involving hydrocyclones), and then is suitable for re-use as a filter aid. Weiergraber (U.S. Pat. No. 5,145,492) describes an apparatus used to thermally treat spent cake, thus resulting in a dry solid material either suitable for landfill or for re-use as a filter aid.

Tremonis GmbH in Germany has reprocessed spent filter cakes from brewing for several years using the Weiergraber technology. The reprocessed material is not a direct replacement for new diatomite filter aids, however, and must be blended with new filter aid material to be used in brewing to filter fermented beverages.

Palm, et al. (PCT/US2016/049975 and PCT/US2016/049966) teach products and processes, respectively, related to the regeneration of media used to clarify and stabilize fermented liquids. Such media comprise regenerated silica gel stabilization products and may optionally include diatomite, perlite, or rice hull ash filtration media. Palm et al. show that such regenerated products are effective in the clarification and stabilization of fermented beverages such as beer. Palm, et al. focus on straight-calcined filter aids and low permeability flux-calcined filter aids (about one Darcy permeability) when mixed together with silica gel, as well as on the properties required of filtration media, such as permeability, centrifuged wet density, and extractable chemistry, and most especially on the stabilization capability of the regenerated silica gel.

In summary, previous concepts for the use of spent cake have been associated with either regeneration and re-use in filtration applications or use in a lower value application, such as soil amendments or animal feed. However, processes for regenerating spent cake that contains diatomite into products suitable for use as white bright functional additives have not been explored.

SUMMARY

In accordance with one aspect of the disclosure, a product is disclosed. The product comprises diatom frustules reclaimed from a filtration waste stream and the product may have a d90 of 25 µm to 50 µm, and an L* brightness value of at least 91.

In an embodiment, the product may be a flatting or opacity additive for the manufacture of a paint.

In another embodiment, the product may be an anti-block additive for the manufacture of plastic film.

In another embodiment, the product may be a filler for the manufacture of an elastomer.

In another embodiment, the L* brightness value of the product may be at least 94.3.

In another embodiment, the product may further have a b* value of no more than 6.2. In a refinement, the product may have a b* value of 2.3 to 3.4.

In another embodiment, the d90 may be no more than 45.2 µm for the product.

In another embodiment, the product may further have a Hegman value of 0.5 to 4.

In another embodiment, the product may further have a centrifuged wet density of 0.3 g/ml to 0.5 g/ml.

In another embodiment, the product may further have an a* value and a b* value, wherein further the sum of the absolute value of the a* value and the absolute value of the b* value may be 0 to 6.7.

In another embodiment, the filtration waste stream may be sourced from filtration of at least one of the following: a fermented beverage, a sweetener, an edible oil, a biodiesel, a lube oil, an amino acid, an antibiotic, a chemical, or a lubricant, or mixtures thereof.

In another embodiment, the filtration waste stream may have a net calorific content in the range of 100 kcal/kg to 10,000 kcal/kg.

In accordance with an aspect of the disclosure, a coating, plastic film, or elastomer is disclosed. The coating, plastic film, or elastomer comprise a product. The product includes diatom frustules reclaimed from a filtration waste stream, and the product may have a d90 of 25 µm to 50 µm, and an L* brightness value of at least 91.

In accordance with another aspect of the disclosure, a method of manufacturing a product is disclosed. The method may comprise: selecting spent cake that includes diatom frustules; drying the spent cake; thermally treating the spent cake to produce reclaimed diatom frustules, the thermal treatment free of gasification or pyrolysis; and, optionally, classifying the reclaimed diatom frustules, wherein the product comprises at least a portion of the reclaimed diatom frustules, wherein further the product may have a d90 of 25 µm to 50 µm, and an L* brightness value of at least 91.

In an embodiment, the thermally treating may be conducted at a temperature range of 900° C. to 1100° C.

In an embodiment, during the thermally treating, the heat contact time for the spent cake may be 10 minutes to 40 minutes.

In an embodiment, the classifying may use an air-swept mechanical classifier to separate the reclaimed diatom frustules into a fine fraction and a coarse fraction.

In an embodiment, the classifying may use a centrifugal sifter to separate the reclaimed diatom frustules into a fine fraction and a coarse fraction.

In an embodiment, the method may further comprise: adding, during or prior to, the thermally treating, a chemical to the spent cake. In a refinement, the chemical may include potassium hydroxide (KOH).

In accordance with another aspect of the disclosure, a method of manufacturing a product is disclosed. The method may comprise: selecting spent cake that includes diatom frustules; recovering energy from the spent cake through gasification or pyrolysis; thermally treating spent cake ash that results from the recovering to produce reclaimed diatom frustules; and classifying the reclaimed diatom frustules, wherein the product comprises at least a portion of the reclaimed diatom frustules, wherein further the product may have a d90 of 25 µm to 50 µm, and an L* brightness value of at least 91.

In an embodiment, the thermally treating may be conducted at a temperature range of 900° C. to 1100° C.

In an embodiment, during the thermally treating, the heat contact time for the spent cake may be 1 minute to 40 minutes.

In an embodiment, the classifying may use an air-swept mechanical classifier to separate the reclaimed diatom frustules into a fine fraction and a coarse fraction.

In an embodiment, the classifying may use a centrifugal sifter to separate the reclaimed diatom frustules into a fine fraction and a coarse fraction.

In an embodiment, the method may further comprise: adding, during or prior to the thermally treating, a chemical to the spent cake. In a refinement, the chemical may include potassium hydroxide.

In accordance with another aspect of the disclosure, a product is disclosed. The product may comprise a first functional additive that includes diatomite previously used as a filtration medium, wherein the product may be a coating, a plastic film or an elastomer.

In an embodiment, the product may be a first coating that when compared to a second coating has a Δ E* of 0.0 to 0.85, the second coating free of a second functional additive that comprises diatom frustules reclaimed from a filtration waste stream and that has a d90 of 25 µm to 50 µm and an L* brightness value of at least 91.

In an embodiment, the product may be a coating that has an L* brightness value of at least 90.

In an embodiment, the product may be a wet coating that includes waterborne latex.

In an embodiment, the product may be a coating that has a contrast ratio of at least 0.80.

In an embodiment, the product may be a coating, wherein the 85° sheen of the coating is no more than 35.

In an embodiment, the first functional additive may be 0.1 wt % to 20 wt % of the product, the first functional additive having a d90 of 25 µm to 50 µm and an L* brightness value of at least 90 or at least 91. In a refinement, the first functional additive may be 0.1 wt % to 15 wt % of the product. In a further refinement, the first functional additive may be 0.1 wt % to 10 wt % of the product.

In an embodiment, the product may be a coating, wherein further the percent gloss increase in 85° sheen from burnish testing may be no more than 150%. In a refinement, the percent gloss increase in 85° sheen from burnish testing may be no more than 100%.

In an embodiment, the product may be a coating, wherein the coating does not fail a scrub resistance test before 800 cycles.

In an embodiment, the product is free of diatom frustules that have not been reclaimed from a filtration waste stream.

DETAILED DESCRIPTION

This disclosure teaches products and methods to manufacture products from spent (filter aid) cake which are usable as replacements for white, bright flux-calcined diatomite functional additives. The method may include the evaluation and selection of the spent cake for suitability as a raw material, thermal treatment to improve optical properties, and, optionally, dispersion or classification to assist with the production of functional additives with the desired particle size distributions.

In some embodiments, the method may also include milling to increase the amount of functional additive with a desired particle size distribution that is produced from the selected spent (filter aid) cake.

In one embodiment, the method also includes processing via gasification or pyrolysis the selected spent cake to recover energy stored in the organic content of the selected spent cake. In a different embodiment, the method further includes drying the selected spent cake prior to thermal treatment.

Figure 1:
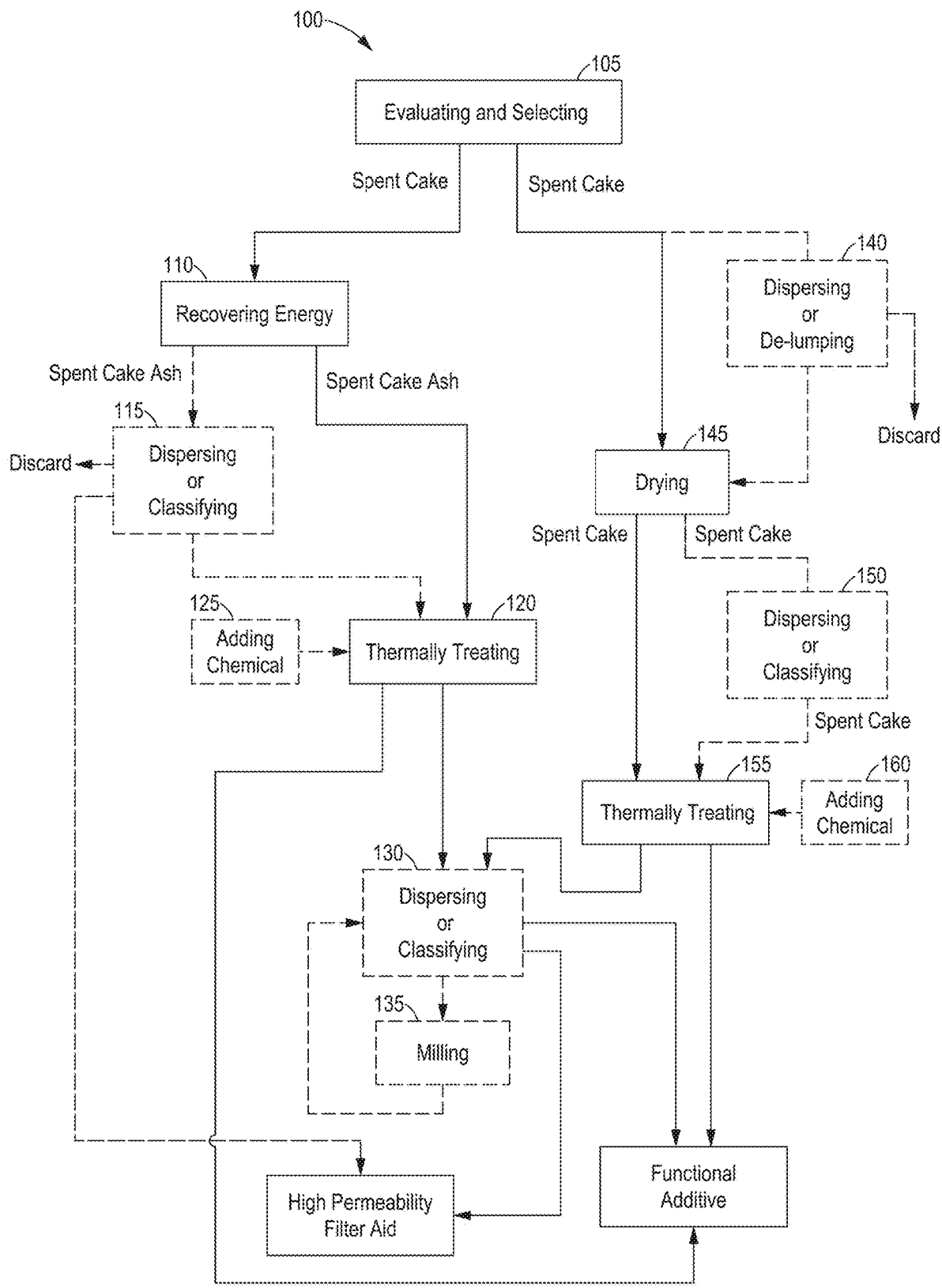
FIG. 1 illustrates a process flow diagram for the manufacturing of products from spent cake.

Referring now to FIG. 1, an exemplary process flow diagram is illustrated showing sample blocks which may be followed to produce products from spent (filter aid) cake. The method 100 may be practiced with more or less than the number of blocks shown and is not limited to the order shown.

Evaluating And Selecting Spent Cake

The method comprises evaluating and selecting spent cake that includes diatom frustules (see block 105 in FIG. 1). Spent cake is removed from the filtration process as either a concentrated slurry or as a close-to-saturated solid. The selected spent cake comprises spent flux-calcined filter aid material (also referred to a spent flux-calcined filter aid or spent flux-calcined filter aid media). The spent flux-calcined filter aid material includes flux-calcined diatomaceous earth. In some embodiments, the spent flux-calcined filter aid material may further include silica gel, or the like. In some other embodiments, the spent flux-calcined filter aid material may further include bleaching clay. In yet some other embodiments, the spent flux-calcined filter aid material may further include silica gel and bleaching clay. Preferably, the selected spent cake is derived only from spent flux-calcined diatomite that has been previously used as a filter aid.

Not all spent cake is suitable for re-manufacture into functional additives. For example, if the original flux-calcined filter aid (containing DE) has too poor of color (e.g., a pink or yellowish color with b* value>7) and/or poor brightness qualities (e.g., L*<85), it is unlikely it can be re-used as a functional additive after it is used in filtration and therefore the spent cake of such would not be selected for use in the regeneration processes. Also, if other additives such as dark bleaching clay (e.g., black bleaching clay) were added during filtration, or if non-volatile solids were captured during filtration, this could make the resulting spent cake unsuitable for remanufacture into high brightness functional additives and therefore such spent cake would not be selected. Thus, the evaluation of and selection of an appropriate spent (filter) cake for use in the regeneration processes is a step in the manufacturing process of the present disclosure.

As noted above, in an embodiment, the selected spent cake includes flux-calcined diatomite (diatomaceous earth) that has been previously used as a filter aid. In another embodiment, the selected spent cake may include flux-calcined diatomite that has been previously used as a filter aid and no more than 20 wt % bleaching clay (wherein, the bleaching clay was substantially white or off-white in color when incorporated into the (now spent) filter aid prior to use). Preferably, the selected spent cake is free of bleaching clay.

In another embodiment, the selected spent cake may include flux-calcined diatomite that has been previously used as a filter aid and no more than 25 wt % non-volatile solids. In a refinement, the non-volatile solids may include silica gel, bleaching clay, or "non-volatile solids captured during prior use" of the filter aid in filtration. Preferably, the selected spent cake is free of non-volatile solids captured during prior use (of the filter aid) in filtration. Preferably, the selected spent cake is free of silica gel; or free of bleaching clay; or free of both silica gel and bleaching clay. More preferably, the selected spent cake is free of non-volatile solids.

In one embodiment, the selected spent cake may include flux-calcined diatomite that has been previously used as a filter aid and no more than 25 wt % non-volatile solids. In a refinement, the non-volatile solids include bleaching clay, wherein the bleaching clay is no more than 20 wt % of the selected spent cake. Preferably, the selected spent cake is free of bleaching clay and is free of non-volatile solids captured during prior use (of the filter aid) in filtration.

Once a spent cake is deemed suitable for recycling into functional additives, it must be processed to remove volatile content (organics and free moisture). This can often be done in such a way that energy is reclaimed, either directly through gasification (direct combustion) or in the form of hydrocarbons captured through pyrolysis (thermochemical decomposition in reducing atmosphere). Energy reclamation makes the most sense for the selected spent cake when the prior use for the spent cake was the filtering of high energy-value liquids (for example, biodiesel). In other cases, such as with spent cake from breweries (filtration of fermented beverages), the spent cake has so much residual moisture that it may not be viable to capture the energy value as one of the principle aims of recycling. Even in these cases however, the thermal energy requirement for recycling into functional additives can be reduced by utilizing the entrained energy of the spent cake. If energy reclamation via gasification or pyrolysis is desired, the method proceeds to block 110 (see FIG. 1). Otherwise, the method may proceed from evaluating and selecting the spent cake (block 105) to the drying process of block 145 (or, optionally, to the dispersing or de-lumping process of block 140 followed by the drying process of block 145), as shown in FIG. 1.

Recovering Energy Through Gasification Or Pyrolysis

Where gasification or pyrolysis are viable desired treatments, the selected spent cake is introduced into a (gasification or pyrolysis) process to capture the energy content (see block 110 in FIG. 1). With gasification, this often means using a solid fuel boiler system or the like, with the burn zone at a temperature in the range of 550° C. to 650° C., with very little air or oxygen. Preferably the burn zone temperature is in the range of 594° C. to 606° C. More preferably, the burn zone temperature is 600° C. The heat contact time for the spent cake during gasification depends on calorific value of the spent cake. Retention time is governed by the calorific value of the cake relative to the heat production. With pyrolysis, the selected spent cake may be fed into an enclosed, heated, rotatable or rotating drum under a reducing or inert atmosphere (no oxygen). The temperature of such a heated drum may be in the range of 600° C. to 1300° C. Preferably, the temperature is in the range of 792° C. to 808° C. More preferably, the temperature is 800° C. The heat contact time for the spent cake is governed by the calorific value of the cake relative to the heat production. The gasification process results in a direct liberation of heat energy along with an ash by-product "spent cake ash" that is significantly free of organic components (<1%). The pyrolysis process results in recovery of liquid hydrocarbon (useful primarily as fuel) and a dry spent cake ash by-product, also substantially free of organic content (<2%).

The DE-bearing spent cake ash from gasification and pyrolysis processes cannot be utilized directly as functional additive because of both particle size distribution, and color or brightness issues. Typically, the particle size distribution is too broad and too coarse, and there are enough residual organics remaining that both color and brightness are degraded; thus, the spent cake ash resulting from the gasification or pyrolysis undergoes further treatment before it can be used as a functional additive. As discussed below, this further treatment includes thermally treating the spent cake ash to produce reclaimed diatom frustules (see block 120 of FIG. 1). Optionally, dispersing or classifying (block 115) of the spent cake ash may be done prior to the thermal treatment (block 120). The spent cake ash may undergo dispersing or classifying (block 130) after thermal treatment (block 120). In some embodiments, the spent cake ash may also undergo milling (block 135).

Dispersing or Classifying Spent Cake Ash (Before Thermal Treatment)

Dispersing the spent cake ash (block 115) resulting from gasification or pyrolysis (the recovering energy step) may be accomplished using a vibratory sieve shaker, centrifugal sifter, or the like. During dispersing, loosely or softly agglomerated spent cake ash material is broken apart, and blended or mixed with finer particles within the same mass of spent cake ash. Classifying may (in addition to classification) also be used to disperse the spent cake ash. Classifying may be done using a mechanical classifier or the like. Dispersing or classifying is optional; but, usually, some sort of de-lumping (breaking up of soft agglomerates) or dispersion is desirable before thermal treatment (block 120). Both dispersing and classifying may be used to remove very coarse particulates, which are undesirable in either functional additives or filter aids, from the spent cake ash. Classification, and to a lesser extent dispersion, can also be used to split the spent cake ash into fine and coarse fractions (representative portions), with the fine fraction undergoing further processing to make functional additives and the coarse fraction discarded or used as-is for high permeability filter aids.

Thermally Treating the Spent Cake Ash

The method further includes thermally treating (block 120) the spent cake ash by subjecting such spent cake ash to relatively high temperatures to produce reclaimed diatom frustules. The thermal treatment removes any remaining organics and improves the color and brightness of the resulting product. The improvement in color and brightness can come at the expense of particle agglomeration (not desired), so a careful balance needs to be struck between contact time, temperature, and any chemical additives that are used. Temperatures in the range of 950° C. to 1050° C., and contact times of 0.5 minute to 45 minutes have been found suitable, a contact time in the range of 1 minute to 40 minutes is preferred. Much shorter contact times (seconds) may be used if the spent cake ash is conveyed through the hot zone in a dilute phase; for example, a contact time in the range of 4 seconds to 40 seconds may be used under those circumstances. Equipment suitable for thermal treatment includes direct or indirect-fired rotary kilns, rotary hearth furnaces, muffle furnaces, or air-swept flash calciners.

Adding a Chemical

In some embodiments of the method, one or more chemical additives (for example potassium hydroxide, soda ash, (other) alkali metal hydroxide(s), (other) alkali metal carbonate(s), alkali metal halide(s) or mixtures thereof), may, optionally, also be used in the thermal treatment to improve brightness and color. One or more such chemicals may be added to the spent cake ash (see block 125 in FIG. 1) prior to thermally treating (block 120) or while thermally treating (block 120). As these chemicals tend to promote particle agglomeration, that factor must be considered and can affect down-stream processing requirements.

Dispersing or Classifying (Post Thermal Treatment)

Depending on the particle size distribution of the material fed to the thermal process (thermally treating (block 120)), it may be desirable to classify or, alternatively, disperse (see block 130) the resulting thermally-treated product. Usually, this involves classification of the thermally treated material into coarse and fine fractions, with the fine fraction suitable for use as functional additive and the coarse fraction useful as a high permeability filter aid. In cases where the feed to the thermal process (block 120) has already been classified with only the fine fraction reporting to the thermal treatment process (block 120), simple dispersion of the heat-treated material may be all that is required (instead of post thermal treatment classification) if there is no agglomeration during the thermal treatment. Equipment that is suitable for classification includes air-swept mechanical classifiers, several of which are commercially available. For example, the Comex ACX (Comex AS, Norway) series of classifiers, or the like, can perform the required separations. The classification equipment contact surfaces preferably should be lined or constructed of materials that will not discolor the product resulting from the thermal treatment. For example, various ceramics or polyurethane are suitable lining materials. Another possible equipment type for classifying the thermally-treated product is the centrifugal sifter. However, while sifting can be used to produce many functional additives, it may not be suitable for production of the finest diatomite functional additive. If wet sieving is used to classify the thermally-treated product, the desired fraction for the functional additive product may be dried after the wet sieving.

Milling

Milling (see block 135) of the coarse fraction is an optional processing step that can be done in conjunction with post thermal treatment classification. This option can result in up to 100% of the thermally-treated product reporting as functional additive with no coarse by-product. However, milling tends to increase the bulk density of the product and can also decrease brightness. Functional additive bulk density and color specifications often preclude the use of milling, or at least limit the amount of milled material that can be included in the final product. Also, any milling employed in the process must not destroy the diatom frustules as their morphology provides functionality to the final product. Suitable milling equipment includes air-swept media mills with ceramic surfaces and media.

If the gasification or pyrolysis of block 110 is not desired (e.g., when the spent cakes do not contain enough net caloric value to justify energy reclamation), the disclosed method alternatively may proceed from evaluating and selecting (block 105) to drying (block 145). Optionally, the selected spent cake may be dispersed or de-lumped (block 140) prior to drying (block 145).

Dispersing or De-Lumping Spent Cake (Before Thermal Treatment)

Dispersing or de-lumping (see block 140 of FIG. 1) the spent cake obtained from the evaluating and selecting (block 105) may be accomplished using a vibratory sieve shaker, centrifugal sifter, or the like. Dispersing or de-lumping is optional; but, usually, some sort of de-lumping or dispersion is desirable before thermal treatment. Dispersing or de-lumping (block 140) may be used to remove very coarse particulates, which are undesirable in either functional additives or filter aids, from the spent cake that resulted from the evaluating and selecting (block 105).

Drying (Before Thermally Treating)

The method may further include drying the selected spent cake (block 145) prior to the thermal treatment of block 155. Rotary dryers, fluid-bed dryers, and moving grate dryers are all exemplary equipment types that can be used to dry the selected spent cake. In an exemplary embodiment, the selected spent cake may be dried until there is less than 10 wt % free moisture remaining. In other embodiments, free moisture remaining may be more or less than 10 wt %, for example less than 5 wt % free moisture remaining (see Examples 1-4). The drying temperatures typically range from 250° C. to 450° C., and drying times from a minute to one hour. Alternatively, the drying step may be accomplished on the same equipment that is used to subsequently thermally treat the spent cake in block 155 (for example, in a two-stage calciner). In some embodiments, the selected spent cake may be de-lumped or dispersed during the drying of block 145. As shown in block 150, in some embodiments, the selected spent cake may be dispersed or classified after the drying of block 145 and prior to thermally treating (block 155) the spent cake.

Thermally Treating the Spent Cake

The method further includes thermally treating (block 155) the (dried) spent cake by subjecting the spent cake to relatively high temperatures to produce reclaimed diatom frustules. The thermal treatment (block 155) removes any remaining organics and improves the color and brightness of the resulting product. This thermal treatment (block 155) is like that used with spent cake ash that results from the gasification and pyrolysis process except that the material being thermally treated is spent cake (not spent cake ash) and the minimum contact time is typically longer (at least 9 minutes, but preferably a minimum contact time of at least 10 minutes) due to the need for oxidation of the higher organic content material of the spent cake (as compared to the spent cake ash). Equipment suitable for thermal treatment (block 155) includes direct or indirect-fired rotary kilns, rotary hearth furnaces, or muffle furnaces. In the case of direct-fired kilns, enough excess oxygen must be available to ensure complete oxidation of the organics. Because of the longer minimum residence time, flash calciners are not appropriate in this case. Similar to the thermal treatment of the spent cake ash, the improvement in color and brightness can come at the expense of particle agglomeration (not desired), so a careful balance needs to be struck between contact time, temperature, and any additives that are used. Temperatures in the range of 950° C. to 1050° C., and contact times of 9 minutes to 45 minutes have been found suitable, a contact time in the range of 10 minutes to 40 minutes is preferred.

Adding a Chemical

In some embodiments of the method, one or more chemical additives (for example potassium hydroxide, soda ash, (other) alkali metal hydroxide(s), (other) alkali metal carbonate(s), alkali metal halide(s) or mixtures thereof), may, optionally, also be used in the thermal treatment of block 155 to improve brightness and color. One or more such chemicals may be added to the spent cake (see block 160 in FIG. 1) prior to thermally treating (block 155) or while thermally treating (block 155). As these chemicals tend to promote particle agglomeration, that factor must be considered and can affect down-stream processing requirements.

Dispersing or Classifying (Post Thermal Treatment)

Depending on the particle size distribution of the spent cake fed to the thermal process (block 155), and the desired particle size of the functional additive, the resulting product of the thermal treating (block 155) may be suitable for use as a functional additive without further dispersing or classifying. Otherwise, after thermal treatment (block 155), the method may proceed to block 130, discussed previously herein, for dispersing or classifying of the thermally treated material. The fine fraction resulting from block 130 may be used for a functional additive and the coarse fraction may be utilized for a high permeability filter aid.

Milling

In some embodiments, the method may further include the milling of block 135 (see herein the previous discussion for block 135).

Description of the Test Methods

Optical Properties

The optical properties of products may be characterized using the color space defined by the Commission Internationale de l'Eclairage (CIE), as the L*a*b* color space. The "L*" coordinate is a measure of reflected light intensity (0 to 100). The L* represents the darkest black at L*=0, and the brightest white at L*=100. The "a*" coordinate is the degree of redness (positive value) or greenness (negative value). The "b*" coordinate is the degree of yellowness (positive value) or blueness (negative value).

The CIE previously developed a chromaticity coordinate system (Yxy) that is also still used in defining the brightness and chromaticity of products. The tristimulus "Y" value is the luminance or brightness factor with a range of values from 0 to 100, where a value of 100 is equivalent to the brightest white and a value of 0 is equivalent to the blackest black. A Konica Minolta® Chroma-meter CR-400 was used to measure the optical properties (L*a*b* and Y) of samples described herein.

Particle Size Distribution

The particle size distribution (P.S.D.) of fine powders can be determined using laser diffraction instrumentation. Particle size distribution of each sample described herein was determined using a Microtrac® S3500 (three stationary lasers, two detectors, Mie scattering theory, ultrasonic dispersion, particle refractive index of 1.48, fluid refractive index of 1.333, irregular particle shape, transparent particles).

Wet Sieve Analysis (+44 μm)

The wet sieve analysis provides an accurate measure of the mass of particles within a powder sample that are coarser than and that are finer than a specific point in the distribution, in this case, 44 μm. In this test, a powder sample of known mass is placed on a test sieve with square-shaped openings of the desired size (in this case, 44 μm). The sample is washed through the sieve using a water spray, and the residue (material coarser than the sieve opening size) is collected, dried, and re-weighed. This value is then compared with the original sample mass to give a measure of the percentage of particles larger than the sieve opening size.

GCOA

The Gardner Coleman Oil Absorption (GCOA) test determines the absorptive capacity of powders. The test gives an indication of unit mass of liquid absorbed per unit mass of solid powder. Liquid of known specific gravity (for example, mineral oil) is dropped into a known mass of powder via burette while the powder is gently worked. When a visual end-point is reached (the powder "glistens"), the test is stopped and absorptive capacity calculated based on the mass of liquid used to saturate the known mass of powder.

Hegman

The Hegman gage and associated test method provide a measure of the degree of dispersion or fineness of grind of a pigment (or other functional additive powder) in a pigment-vehicle system. It is used to determine if a functional additive is of an appropriate size to embody the finished film (paint or plastic) with desired surface smoothness and other properties. Hegman values range from 0 (coarse particles) to 8 (extremely fine particles), and are related to the coarser end of the particle size distribution of the sampled powder. The Hegman gage and test method are described in detail in American Society of Testing and Materials (ASTM) method D1210 (Standard Test Method for Fineness of Dispersion of Pigment-Vehicle Systems by Hegman-Type Gage). The gage itself is a polished steel bar into which a very shallow channel of decreasing depth is machined. The channel is marked on its edge with gradations corresponding to Hegman values (0 to 8). The powder sample is dispersed within a liquid vehicle (paint, oil, etc.), and a small quantity of the suspension is poured across the deep end of the channel. A scraper is then used to draw the suspension toward the shallow end of the channel. The channel of the gage is then visually inspected in reflected light, and the point at which the suspension first shows a speckled pattern corresponds with the Hegman value.

Moisture Content

The free moisture content of spent cake and other materials can be determined by measuring the sample mass before and after drying at low temperature (105° C.) for an exposure time of 24 hours. Relatively low temperature is needed to prevent volatilization of organic content.

Loss on Ignition

The loss on ignition test provides an estimate of the volatile content (by mass) of dried spent cake or other materials. The test is performed by measuring the dried sample mass before and after heating at 1000° C. for at least one hour. This test gives an approximate measure of the organic content of a sample.

Energy Content of Spent Cake

The energy content of spent cake can be determined based on ASTM method D5865-13 (Standard Method for Gross Calorific Value of Coal and Coke). This method includes the placement of a weighed sample of spent cake within an oxygen pressure bomb, ignition of the sample within the bomb, and measurement of the temperature rise of a surrounding water bath. From these data, the calorific value of the spent cake can be calculated according to the following formula:

$$Q_{vad} = [(tE_e) - e1 - e2 - e3 - e4]/m$$

Where:
$Q_{vad}$ = gross caloric value at constant volume (cal/g);
$E_e$ = the heat capacity of the calorimeter, (cal/° C.);
t = corrected temperature rise (° C.);
e1 = acid correction (cal);
e2 = fuse correction (cal);
e3 = sulfur correction (cal);
e4 = combustion aid correction (cal);
m = mass of sample (g).

The corrected temperature rise is: the final temperature less the initial temperature, plus a correction for emergent stem (depends on whether thermometer is totally immersed or not) plus a correction for radiation (compensates for heat loss or gain to the "isoperibol" water jacket). The e1 value is a correction factor applied to compensate for the formation of nitric acid during the test. It is usually orders of magnitude less than the total released energy. The e2 value is a correction to compensate for the energy contributed by the firing fuse (fuses are energy-rated per mm of length, so this is a matter of determining how much fuse was used). Again, it is generally miniscule compared to the total energy released. The e3 value is a correction factor to compensate for the fact that this test produces sulfuric acid when the theoretical calorific value is based on formation of sulfur dioxide. The magnitude of e3 depends on how much sulfur is present in the sample. The e4 value is a correction factor to compensate for when a combustion aid is utilized in the test. The energy attributed to the combustion aid (known prior to testing) is subtracted from the total released.

Paint Testing

Paint testing involves the incorporation of the specific functional additive within a paint formulation, preparation of draw-downs, and determination of specific properties of the dried paint film in comparison with controls.

In one embodiment, a waterborne latex paint formulation with a pigment volume concentration (PVC) of 51 and 35 vol. % total solids was used. In such an embodiment, the DE accounts for 6.7 wt % of the formulation, 12.8 wt % of the total solids, and 17.9 wt % of the pigment and filler solids (which also includes titanium dioxide, nepheline syenite, and calcium carbonate). In another embodiment, a waterborne latex paint formulation with a PVC of 27 and 38 vol. % total solids was used. In such an embodiment, the DE accounts for 2.9 wt % of the formulation, 5.5 wt % of the total solids, and 10.5 wt % of the pigment and filler solids (which also includes titanium dioxide and calcium carbonate). In another embodiment, a waterborne latex paint formulation with a PVC of 25 and 38 vol. % total solids was used. In such an embodiment, the DE accounts for 1.5 wt % of the formulation, 2.8 wt % of the total solids, and 5.5 wt % of the pigment and filler solids (which also includes titanium dioxide and calcium carbonate). In other embodiments, the DE may account for 0.1 wt % to 20 wt % of the formulation, or more preferably for 0.1 wt % to 10 wt %, depending on the attributes of the desired paint and related costs. Economical flat paints may have higher DE loadings if wear characteristics are less important. Formulations for other types of paints and appropriate level of DE incorporation to achieve certain paint characteristics will be known to those skilled in the art.

PVC values are often used to roughly identify the type of paint that will be produced in terms of the resultant gloss and sheen characteristics. DE-based functional additives are often incorporated in coatings with lower sheen values such as flat, velvet, or eggshell paints (all with 85° sheen values typically no more than 35), but may be utilized in higher sheen paints such as semi-gloss or gloss (typically with 60° gloss values greater than 35). Without any DE, the exemplary paint formulation utilized herein has a 85° sheen value of about 11.2 and decreases to different values when DE is incorporated depending on the characteristics of the DE. It is possible to create higher sheen paints, with 85° sheen values no more than 35, using a finer DE sample or altering the formulation. In exemplary paint formulations utilized herein, samples with 85° sheen values between 0.6 and 33 were demonstrated. As such, using the teachings herein, an embodiment of a paint that incorporates a functional additive manufactured as disclosed herein, the 85° sheen of the coating may be up to (and including) 35.

Sample paints were cast at 76.2 μm (3 mil) wet thickness onto a Leneta® Form 3B chart (Leneta Company, USA) using a bird applicator. The films were dried under ambient conditions for three days prior to measurement. The tint strength of the paints was also tested by adding lamp black pigment to the white paint at a loading of 59.15 ml (2 fluid ounces) per 3.785 L (1 gallon) of paint. Drawdowns of the tinted paint were completed in the same manner as for the initial paint.

Optical properties of interest for the finished paint include brightness, color, contrast ratio, gloss or sheen, and color match. The contrast ratio is a measure of the opacity of a paint or how well a paint "hides" the underlying film or substrate. Contrast ratio is calculated by dividing the Y value measured on the black area of the Leneta chart by the Y value measured on the white area:

$$\text{Contrast ratio} = \frac{Y_{blackarea}}{Y_{whitearea}}$$

As a ratio, the values of contrast ratio are bound by 0.0 and 1.0 where 0.0 refers to no hiding power and 1.0 refers to complete hiding power. High contrast ratio is often desirable to reduce the number of coatings required to complete a paint job to the customer's satisfaction.

Gloss or sheen of a surface refers to the light reflectivity of that surface at specific incident angles (commonly, 20°, 60°, 85° for paints). Typically, when the 60° gloss value is less than 20, only the 85° sheen is reported. Here, the gloss and sheen values were measured by a gloss meter (micro-TRI-gloss 4520 or micro-TRI-gloss 4446, BYK Gardner®, USA).

The difference in overall color between a paint sample and a reference sample or a control sample ($\Delta E^*$) can be calculated from the measured difference in L*, a*, and b* values between the sample and a "reference" or control sample. The difference in L*, a*, and b* ($\Delta L^*$, $\Delta a^*$, and $\Delta b^*$, respectively) can be used to calculate $\Delta E^*$ by:

$$\Delta E^* = \sqrt{(\Delta L^*)^2 + (\Delta a^*)^2 + (\Delta b^*)^2}$$

A perfect color match corresponds to $\Delta E^* = 0$. In general, a value of $\Delta E^* < 1.0$ is considered an acceptable color match.

Additional paint testing included burnish and scrub resistance testing. Here, an abrasion scrub tester (BYK Gardner, USA) was utilized. For each test, three paint drawdowns, each cast at (7 mil) wet thickness onto a black plastic scrub panel (Leneta) using a multiple clearance square applicator. The films were dried under ambient conditions for three days prior to measurement.

When paint films are rubbed, the paint may become shiny, particularly if there is a high amount of functional additives utilized in the formulation. The resistance of films to become shiny after rubbing is known as the burnish resistance. Burnish resistance testing was conducted in a manner similar to ASTM D6736-01 (Standard Test Method for Burnish Resistance of Latex Paints). According to the method, the dried paint panel is placed on the tester and secured with a gasketed frame. Following, a layer of 4-ply cheesecloth is rubbed across the dried paint panel for 20 cycles. Here, the cheesecloth was secured over sandpaper (P80 grit). Three equally spaced gloss measurements were taken before and after rubbing the panel. The gloss angles were recorded using the previously noted gloss meter. The initial and final gloss values were reported as the percent increase in gloss which is calculated by:

$$\% \text{ Gloss Increase} = 100 * \frac{\text{Final gloss value} - \text{Initial gloss value}}{\text{Initial gloss value}}$$

Lower values of percent gloss increase are preferred.

Wet scrubbing of paint, with an abrasive or non-abrasive media, can lead to paint removal. The resistance to such paint removal is characterized by the scrub resistance. Scrub resistance testing was conducted following ASTM D2486-00 (Standard Test Methods for Scrub Resistance of Wall Paints) with standardized abrasive type scrub medium (BYK Gardner 8129) and a nylon brush. The nylon brush is pre-conditioned by soaking in distilled water for at least 24 hours and then cycled 400 times on a blank (unpainted) panel. According to the method, a brass shim (12.7 mm×0.25 mm) is placed onto the tester with the dried paint panel atop it. The panel is then secured using the gasket frame. Following, 5 mL of distilled water is poured evenly along the length of the paint drawdown within the test region. Then, 10 g of the scrub medium is applied to a pre-conditioned nylon brush which is then fitted to the testing apparatus. After 400 cycles, another 5 mL of water is applied to the paint drawdown and 10 g of the scrub medium is applied to the brush. Here, each sample underwent 800 scrub cycles followed by rinsing with water to remove the scrub medium. Photographs for comparison (see FIGS. 2A-2B) were taken at this point rather than run each sample to failure. Failure occurs when at least one continuous thin line of paint is removed across the width of the shim. Paints with higher scrub resistance will show less wear and/or not fail.

Permeability and Wet Bulk Density

Permeability and bulk density of filter media comprising diatomite are determined using various established methods. These parameters are useful in characterizing how such products perform in filtration applications. The samples described herein were analyzed for these properties using a Celatom Permeameter (U.S. Pat. No. 5,878,374), which is an automated instrument that forms a "filter cake" from a diatomite sample of known mass and then measures all required parameters needed to calculate permeability and wet bulk density. The equations for calculating wet bulk density (WBD) and permeability are listed below:

$$\text{Wet Bulk Density (g/ml)} = m/(h*A)$$

$$\text{Permeability (Darcy)} = (V*u*h)/(A*dP*t)$$

Where: A=cross-sectional area of the cake (cm$^2$)
dP=pressure drop across the cake (atm)
t=time of flow (s)
m=dry sample mass (g)
u=filtrate viscosity (cp)
V=filtrate volume (ml)
h=cake height (cm)

Centrifuged Wet Density

Another method for determining the bulk density of products comprising diatomite involves the use of a centrifuge. This method, described by Palm et al. in U.S. Pat. No. 6,712,898, involves the suspension of a powder sample (1 to 2 g) in deionized water in a calibrated 15 ml centrifuge tube, followed by centrifugation under specific conditions (5 minutes at 2500 rpm on an International Equipment Company Centra® MP-4R centrifuge, equipped with a Model 221 swinging bucket rotor).

The volume of deionized water in which the powder sample is suspended is enough to make up a volume of approximately 10 ml in the centrifuge tube. The mixture is shaken thoroughly so that there is no dry powder remaining in the centrifuge tube. According to the method of Palm et al. (U.S. Pat. No. 6,712,898), "[a]dditional deionized water is added around the top of the centrifuge tube to rinse down any mixture adhering to the side of the tube from shaking." Post-centrifugation, the volume level of the settled material is measured. The sample weight of the powder sample divided by the measured volume of the settled material (post centrifugation) is the centrifuged wet density of the powder sample. The test results in a measurement of bulk density called "centrifuged wet density" (CWD). CWD is useful for analyzing the bulk density of fine powders when sample size is limited. Results correlate closely to those obtained using the Celatom Permeameter.

Bulk Chemistry

The bulk chemistry or elemental analysis of a material can be determined using wavelength-dispersive X-ray fluorescence (XRF) spectroscopy. A Bruker® S4 Explorer WDXRF spectrometer was used to determine the bulk chemistry of samples described herein.

EXAMPLES

Disclosed herein are various products (for example, functional additives such as: flatting additives for use in the manufacture of paint, opacity additives for use in the manufacture of paint, anti-block additives for use in the manufacture of plastic film, fillers for use in the manufacture of elastomers, and the like). Each such functional additive product disclosed herein comprises diatom frustules reclaimed from a filtration waste stream, wherein the product has an L* brightness value of 90 to 100. In a refinement, the product may have a d90 of 25 μm to 50 μm. In a further refinement, the product may have: a d90 of 25 μm to 48.6 μm; a d90 of 25 μm to 45.2 μm; a d90 of 25 μm to 42.2 μm; or a d90 of 28 μm to 49 μm.

In a refinement of any of the embodiments above, the L* brightness value of the product may be: 91 to 100; 91 to 97; 94.3 to 97; or 94.3 to 100.

In a refinement of any one of the embodiments above, the product may have a b* value of: 0 to 6.2; 2.0 to 4; 2.3 to 3.9; or 2.3 to 3.4.

In a refinement of any one of the embodiments above, the product may have a Hegman value of 0.5 to 4; 1.0 to 4; or 1.0 to 3.5.

In a refinement of any one of the embodiments above, the product may have a centrifuged wet density of 0.3 g/ml to 0.5 g/ml or 0.3 g/ml to 0.45 g/ml.

In a refinement of any one of the embodiments above, the product may have an a* value of: −0.5 to 0.5; −0.5 to 0.4; −0.5 to 0.1; or −0.1 to 0.1.

In a refinement of any one of the embodiments above, the product may have an a* value and a b* value, wherein further the sum of the absolute value of the a* value and the absolute value of the b* value may be 0 to 6.7.

In a refinement of any of the embodiments above, the Y value of the product may be: 79 to 100; 88 to 100; or 79 to 95.

In a refinement of any of the embodiments above, the GCOA may be 120% to 150%, or 120% to 140%, or 120% to 135%.

In any one of the embodiments disclosed herein, the product may be in powder form.

Also disclosed herein are filter aids, filter media, and the like, which may be produced as by-products of the process that produces functional additive from spent cake. Such a by-product filter aid has a permeability that is greater than the original filter aid that became a component of the spent cake.

Various examples of the products of the present disclosure are given in the tables below. These examples are offered by way of illustration and not by way of limitation.

Examples 1 Through 4

Exemplary Functional Additives from Corn Wet-Milling Spent Cake

Several samples of functional additives comprising flux-calcined diatomite were prepared in the laboratory from spent cake samples obtained from filtration processes associated with corn wet-milling (for corn syrup and maltodextrin production). These raw materials were partially dried after original use as filter aids, and contained diatom frustules, and between 20 wt % and 45 wt % captured organics (corn solids) along with significant remaining moisture (15 wt % to 36 wt %). Table 3 presents information regarding processing conditions and product characteristics associated with some of these samples.

The first sample (Example 1) of spent cake (containing diatom frustules) was processed as follows: drying (to less than 5 wt % free moisture) the selected spent cake; then sieving the (dried) spent cake through a 12 mesh (1.7 mm) sieve (dispersing step); adding a chemical, 5 wt % KOH in solution, to the spent cake; and thermally treating the spent cake by heating such in an electric muffle furnace under ambient atmospheric conditions (21% oxygen) to remove the captured organics (and to improve the color and brightness). The KOH was added to help improve brightness and to inhibit crystalline silica formation. Introduction of the sample into the hot muffle furnace resulted in the combustion and volatilization of the organic and free moisture content. After thermally treating, the material was classified by wet-sieving through a 325 mesh (44 µm) sieve (classifying post thermal treatment). The minus 325 mesh fraction was dried and retained as the functional additive product.

Examples 2 through 4 were prepared using spent cake (containing diatom frustules) from a different corn wet-milling operation. Once again, the spent cake was dried (to less than 5 wt % free moisture) (drying step); then sieved through a coarse screen (dispersing step) prior to thermally treating. No brightness additives were used, and the same combustion of organics was observed. With examples 3 and 4, after thermally treating, the material was classified by wet-sieving through a 325 mesh (44 µm) sieve (classifying post thermal treatment), and the minus 325 mesh fraction was dried and retained as the functional additive product. Example 2 is primarily the minus 325 mesh fraction of the thermally-treated material, but also includes coarser material that was milled (milling step) using a Spex Mill with ceramic media. (A Spex Mill is a high-energy ball mill used for milling small batch samples to fine particulate size.) The density of this product is higher than the others due to the milling, but still within the acceptable range for this category of functional additive.

TABLE 3

Exemplary Functional Additives made from Corn Wet-Milling Spent Cake

| Sample | Example 1 | Example 2 | Example 3 | Example 4 |
|---|---|---|---|---|
| Original Moisture (%) | 15 | 36 | 36 | 36 |
| Original LOI (%) | 45 | 20 | 20 | 20 |
| Original Calorific Value (kcal/kg) | n/a | 477 | 477 | 477 |
| Thermal Treatment Temp. (° C.) | 982 | 1010 | 1038 | 1038 |
| Thermal Treatment Time (minutes) | 40 | 35 | 35 | 35 |
| Additives | 5% KOH | none | none | none |
| Functional Additive Recovery (%)[1] | n/a | 54 | 27 | 22 |
| Optical Properties | | | | |
| Y | 88.6 | 87.4 | 88.9 | 87.7 |
| L* | 95.4 | 94.9 | 95.6 | 95.0 |
| a* | −0.4 | 0.0 | 0.0 | 0.0 |
| b* | 3.3 | 3.3 | 2.9 | 2.8 |
| Particle Size Distribution | | | | |
| d10 (µm) | 9.7 | 7.2 | 9.1 | 13.1 |
| d50 (µm) | 26.3 | 18.9 | 21.7 | 27.8 |
| d90 (µm) | 47.9 | 38.0 | 41.4 | 48.6 |
| d99 (µm) | 90 | 81 | 84 | 88 |
| Hegman | 0.5 | 2.5 | 2.5 | 2.0 |
| CWD (g/ml) | 0.39 | 0.45 | 0.36 | 0.33 |
| Bulk Chemistry (XRF results expressed as oxides) | | | | |
| $SiO_2$ (wt %) | 86.1 | 88.9 | 89.5 | 89.3 |
| $Al_2O_3$ (wt %) | 3.7 | 3.8 | 3.7 | 3.8 |
| CaO (wt %) | 0.3 | 0.3 | 0.3 | 0.3 |
| MgO (wt %) | 0.2 | 0.2 | 0.2 | 0.2 |
| $Na_2O$ (wt %) | 4.7 | 4.0 | 3.7 | 3.8 |
| $K_2O$ (wt %) | 1.8 | 0.1 | 0.1 | 0.1 |
| $Fe_2O_3$ (wt %) | 1.8 | 1.8 | 1.7 | 1.7 |
| $TiO_2$ (wt %) | 0.2 | 0.2 | 0.2 | 0.2 |

[1]Percent of ignited solids reporting to the functional additive product. (Amount of functional additive material divided by the amount of solid material output from the calcination process.)

Examples 5 Through 10

Exemplary Functional Additives from Biodiesel Spent Cake

Exemplary samples of functional additives were also prepared from selected spent cake (containing diatom frustules) that was used in the manufacture of biodiesel products. These selected spent cake samples were initially treated in one of two ways to recover the energy stored within the organic components, via gasification or via pyrolysis (recovering energy step). Energy recovery was on the order of 4800 kcal/kg for the spent biodiesel cakes of these examples. In other embodiments, the energy recovery from spent cake associated with the manufacture of biodiesel products or the like may be as much as 5000 kcal/kg, 6000 kcal/kg, 7000 kcal/kg, 8000 kcal/kg or 10,000 kcal/kg. The spent cake ash by-products of these two processes (gasification, pyrolysis) were further processed to produce functional additives, with processing and product data included in Table 4.

Example 5 was further processed by: classifying to remove a coarse fraction of the gasification ash using a Comex ACX-50 air classification system (mechanical classifier); thermally treating the fine fraction to remove any remaining organics and improve the color and brightness of the spent cake ash; and then additionally sieving (dispersing or classifying) to remove any remaining coarse particles.

Example 6 was further processed by: dry sieving (classifying) gasification spent cake ash at 120 mesh (125 µm); thermally treating the minus 120 mesh fraction of the spent cake ash; classifying by wet-sieving at 270 mesh (53 µm); and milling using a Spex Mill the plus 270 mesh fraction and adding the result of the milling to the minus 270 mesh fraction.

Example 7 was further processed by: removal of a coarse fraction of pyrolysis spent cake ash using a Comex ACX-50 air classification system (classifying); thermally treating the fine fraction that results from the classifying; and dispersing the thermally treated spent cake ash product through a 120-mesh sieve (dispersing).

Example 8 was further processed by: thermally treating the gasification spent cake ash for one minute in an electric muffle furnace; and then wet-sieving at 270 mesh with the minus 270 mesh fraction collected (classifying step) and dried as functional additive product.

Example 9 was further processed by: thermally treating the gasification spent cake ash in an electric muffle furnace; and then wet-sieving at 325 mesh (44 µm), with the minus 325 mesh fraction collected (classifying step) and dried as functional additive product.

Example 10 was further processed by: thermally treating the gasification ash; and then removing the coarse fraction using a Comex ACX-50 air classification system (classifying), the fine fraction remaining suitable for use as a functional additive.

TABLE 4

Exemplary Functional Additives made from Biodiesel Spent Cake

| Sample | Ex. 5 | Ex. 6 | Ex. 7 | Ex. 8 | Ex. 9 | Ex. 10 |
|---|---|---|---|---|---|---|
| Energy Recovery Process | Gasification | Gasification | Pyrolysis | Gasification | Gasification | Gasification |
| Ash Initial Optical Properties | | | | | | |
| Y | 66.3 | 66.3 | 53.1 | 66.3 | 66.3 | 66.3 |
| L* | 85.2 | 85.2 | 77.9 | 85.2 | 85.2 | 85.2 |
| a* | 0.2 | 0.2 | 1.0 | 0.2 | 0.2 | 0.2 |
| b* | 2.5 | 2.5 | 6.5 | 2.5 | 2.5 | 2.5 |
| Ash Initial P.S.D. | | | | | | |
| d10 (μm) | 14.3 | 14.3 | 12.9 | 14.3 | 14.3 | 14.3 |
| d50 (μm) | 37.3 | 37.3 | 38.4 | 37.3 | 37.3 | 37.3 |
| d90 (μm) | 109.0 | 109.0 | 100.6 | 109.0 | 109.0 | 109.0 |
| d99 (μm) | 249 | 249 | 230 | 249 | 249 | 249 |
| Thermal Treatment Temp. (° C.) | 1010 | 1038 | 982 | 1010 | 1010 | 1038 |
| Thermal Treatment Time (minutes) | 35 | 35 | 35 | 1 | 35 | 20 |
| Additives | none | none | none | none | none | none |
| Functional Additive Recovery (%)[1] | 48 | 43 | 33 | 55 | 32 | 12 |
| Recovered Functional Additive Optical Properties | | | | | | |
| Y | 90.1 | 90.8 | 88.8 | 85.9 | 90.9 | 79.4 |
| L* | 96.0 | 96.3 | 95.5 | 94.3 | 96.4 | 91.4 |
| a* | 0.1 | 0.0 | -0.5 | 0.4 | 0.1 | -0.1 |
| b* | 3.4 | 3.0 | 6.2 | 3.0 | 2.9 | 2.3 |
| Recovered Functional Additive P.S.D. | | | | | | |
| d10 (μm) | 12.8 | 11.2 | 9.2 | 12.2 | 12.5 | 7.3 |
| d50 (μm) | 23.3 | 23.4 | 17.7 | 24.3 | 23.7 | 14.4 |
| d90 (μm) | 40.9 | 42.2 | 33.5 | 45.2 | 42.1 | 28.7 |
| d99 (μm) | 74 | 76 | 71 | 86 | 76 | 62 |
| Hegman | 2.5 | 2.5 | 3.0 | 1.5 | 2.0 | 4.0 |
| CWD (g/ml) | 0.31 | 0.37 | 0.32 | 0.36 | 0.35 | 0.39 |
| Bulk Chemistry (XRF results expressed as oxides) | | | | | | |
| SiO2 (wt %) | 93.3 | 93.3 | 89.3 | 93.0 | 93.1 | 93.4 |
| Al2O3 (wt %) | 2.2 | 2.2 | 1.8 | 2.3 | 2.2 | 2.2 |
| CaO (wt %) | 0.5 | 0.5 | 1.3 | 0.5 | 0.5 | 0.5 |
| MgO (wt %) | 0.3 | 0.3 | 0.6 | 0.3 | 0.3 | 0.3 |
| Na2O (wt %) | 2.2 | 2.1 | 3.4 | 2.3 | 2.3 | 2.1 |
| K2O (wt %) | 0.1 | 0.2 | 0.2 | 0.2 | 0.2 | 0.1 |
| Fe2O3 (wt %) | 1.2 | 1.2 | 3.2 | 1.2 | 1.2 | 1.2 |
| TiO2 (wt %) | 0.1 | 0.1 | 0.1 | 0.1 | 0.1 | 0.1 |

[1]Percent of ignited solids reporting to the functional additive product.

Examples 11 and 12

By-product Filter-Aids Made from Spent Cake Containing DE

Table 5 includes permeability and bulk density data for two by-product samples in comparison to the original filter aids from which they were derived. By removing most of the fine fraction via classification (to make a functional additive), the by-product filter aid that is produced is coarser and of higher permeability than the original filter aid. Examples 11 and 12 in Table 5 demonstrate that the filter aid so recovered is of considerably higher permeability than the original filter aid that became a component of the spent cake. While this new by-product filter aid might not be able to be utilized in the same type of filtration as the original filter aid, there are many filtration applications where such a high permeability filter aid comprised of DE is desirable.

TABLE 5

By-Product Filter Aids made from Spent Cake Containing DE

| Sample | Example 11 | Example 12 |
|---|---|---|
| Permeability: | | |
| Original Filter Aid (Darcy) | 2.45 | 4.73 |
| By-product of Recycling Process (Darcy) | 4.37 | 8.68 |
| Wet Bulk Density: | | |
| Original Filter Aid (g/ml) | 0.32 | 0.29 |
| By-product of Recycling Process (g/ml) | 0.35 | 0.28 |

Examples 13 Through 18

Functional Additives from Spent Cake Used in Paint Application

Splits (representative samples) of certain samples (some described previously) were incorporated in paint and subjected to standard paint tests in comparison with a comparable paint made using a virgin flux-calcined diatomite functional additive that is commercially available (EP Minerals MW-27). Results of the paint tests using a waterborne latex paint formulation with PVC of 51, as previously described, are shown in Table 6 (Examples 13-17).

The ΔL* values in the table indicate the degree of difference between the paints in comparison to the comparable "control" paint that was made using the virgin flux-calcined diatomite functional additive that is commercially available (EP Minerals MW-27). The Δa* values in the table indicate the degree of difference between the paints in comparison to the comparable "control" paint that was made using the virgin flux-calcined diatomite functional additive that is commercially available (EP Minerals MW-27). The Δb* values in the table indicate the degree of difference between the paints in comparison to the comparable "control" paint that was made using the virgin flux-calcined diatomite functional additive that is commercially available (EP Minerals MW-27). The ΔE* values in the table indicate the degree of difference between the paints in comparison to the comparable "control" paint that was made using the virgin flux-calcined diatomite functional additive that is commercially available (EP Minerals MW-27). ΔE* values less than 1.0 indicate that there is no discernable difference in color and brightness, and show that the functional additives made from spent cake (Examples 13-17) can be successfully substituted for virgin (new and not regenerated) product in both a white and a tinted paint. This is a somewhat surprising and unexpected result in that none of the example products had a b* value as low as the MW-27 control sample.

All samples (Example 13-Example 17) provided similar or better flatting (lower 85° sheen values) than the control (EP Minerals MW-27) in the utilized paint formulation.

Example 17 discloses yet another functional additive sample produced via the processes of this invention (the functional additive sample of Example 17. The functional additive sample of Example 17 was prepared from selected spent cake (containing diatom frustules) that was used in the manufacture of biodiesel products. The spent cake sample was initially treated to recover the energy stored within the organic components, via gasification (recovering energy step), and then was further processed by thermally-treating at 1038° C. for 20 minutes, and air-classifying using a Comex ACX-50). Example 17 also discloses a paint incorporating such functional additive. The (white) paint was tested for burnish and scrub resistance and the results compared to that of a comparable paint made using EP Minerals MW-27. The percent gloss increase in 85° sheen for the paint incorporating the functional additive of Example 17 produced from spent cake was lower than that of the comparable paint made using EP Minerals MW-27, indicating improved performance. The improved performance of the paint incorporating the functional additive of Example 17 produced from spent cake may be due to the additional calcination step providing increased particle hardness.

Figure 2A:
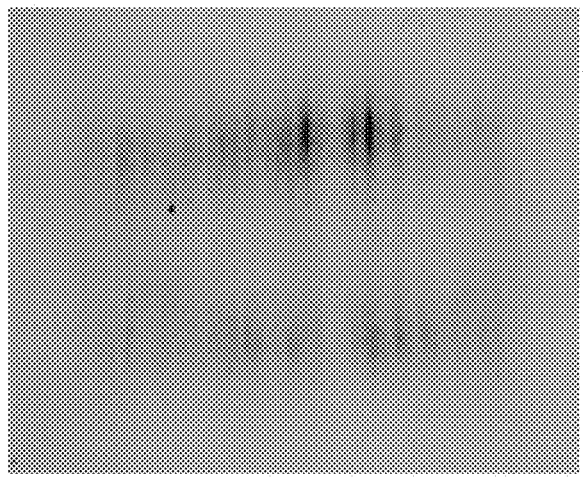
FIG. 2A is a photo of paint film after scrub resistance testing (800 cycles) for the paint incorporating EP Minerals MW-27.
Figure 2B:
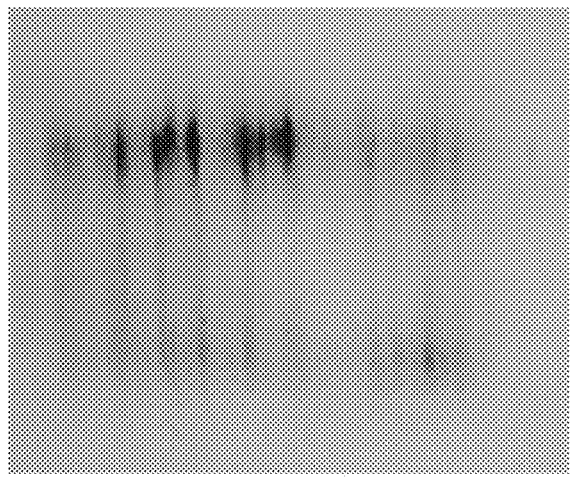
FIG. 2B is a photo of paint film after scrub resistance testing (800 cycles) for the paint incorporating the functional additive of Example 17.

FIG. 2A is a photo of paint film after scrub resistance testing (800 cycles) for the paint incorporating EP Minerals MW-27 and FIG. 2B is a photo of paint film after scrub resistance testing (800 cycles) for the paint incorporating the functional additive of Example 17. As can be seen in a comparison of FIG. 2A to FIG. 2B, after 800 cycles, the scrub resistance of the paint incorporating EP Minerals MW-27 (FIG. 2A) was slightly better than the scrub resistance of the paint that incorporated the sample of the functional additive of Example 17 (FIG. 2B), which was produced from spent cake. If the sample produced from spent cake has a higher hardness than EP Minerals MW-27, the scrub resistance may be impacted by removal of harder particles occurring at a higher frequency than wearing of particles. Additionally, the sample produced from spent cake has a coarser particle size distribution which may also negatively impact the scrub resistance. The scrub resistance may be improved by utilizing different process conditions and/or finer particle size distribution.

TABLE 6

Exemplary Paint Test Results

| | Sample | MW-27 Control 2A0917F | Ex. 13 | Ex. 14 | Ex. 15 | Ex. 16 | Ex. 17 |
|---|---|---|---|---|---|---|---|
| Functional Additive analysis | Functional Additive Source | | Ex. 3 | Ex. 2 | Ex. 5 | Ex. 6 | |
| | Optical Properties | | | | | | |
| | Y | 93.2 | 88.9 | 87.4 | 90.1 | 90.8 | 82.6 |
| | L* | 97.3 | 95.6 | 94.9 | 96.0 | 96.3 | 92.8 |
| | a* | -0.1 | 0.0 | 0.0 | 0.1 | 0.0 | 0.1 |
| | b* | 1.4 | 2.9 | 3.3 | 3.4 | 3.0 | 3.9 |
| | Particle Size Distribution | | | | | | |
| | d10 (µm) | 7.4 | 9.1 | 7.2 | 12.8 | 11.2 | 12.0 |
| | d50 (µm) | 14.3 | 21.7 | 18.9 | 23.3 | 23.4 | 24.1 |
| | d90 (µm) | 28.6 | 41.4 | 38.0 | 40.9 | 42.2 | 43.3 |
| | d99 (µm) | 62 | 84 | 81 | 74 | 76 | 83 |
| | GCOA (%) | 143 | | | | | 140 |
| | Hegman | 2.0 | 2.5 | 2.5 | 2.5 | 2.5 | 2.0 |
| | CWD (g/ml) | 0.38 | 0.36 | 0.45 | 0.31 | 0.37 | 0.37 |
| Paint analysis, initial (white paint) | Y | 87.6 | 87.7 | 88.1 | 87.8 | 87.8 | 87.0 |
| | Contrast Ratio | 0.89 | 0.92 | 0.92 | 0.90 | 0.90 | 0.92 |
| | L* | 95.0 | 95.1 | 95.2 | 95.1 | 95.1 | 94.8 |
| | a* | -0.4 | -0.3 | -0.3 | -0.5 | -0.4 | -0.4 |
| | b* | 1.2 | 1.3 | 1.5 | 1.3 | 1.2 | 1.3 |
| | ΔL* vs MW-27 | 0.0 | 0.1 | 0.2 | 0.1 | 0.1 | -0.2 |
| | Δa* vs MW-27 | 0.0 | 0.1 | 0.1 | -0.1 | 0.0 | 0.0 |
| | Δb* vs MW-27 | 0.0 | 0.1 | 0.3 | 0.1 | 0.0 | 0.1 |
| | ΔE* vs MW-27 | 0.0 | 0.2 | 0.3 | 0.2 | 0.1 | 0.2 |
| | Gloss 60° | 2.0 | 2.0 | 2.1 | 1.9 | 2.0 | 2.0 |
| | Sheen 85° | 0.8 | 0.6 | 0.8 | 0.6 | 0.6 | 0.6 |
| Paint analysis, tinted paint | L* | 66.8 | 66.8 | 67.5 | 66.5 | 66.9 | 66.7 |
| | a* | -0.5 | -0.5 | -0.5 | -0.6 | -0.6 | -0.5 |
| | b* | -3.2 | -3.4 | -3.4 | -3.4 | -3.5 | -3.6 |
| | ΔL* vs MW-27 | 0.0 | 0 | 0.7 | -0.3 | 0.1 | 0.1 |
| | Δa* vs MW-27 | 0.0 | 0 | 0 | -0.1 | -0.1 | 0 |
| | Δb* vs MW-27 | 0.0 | -0.2 | -0.2 | -0.2 | -0.3 | -0.4 |
| | ΔE* vs MW-27 | 0.0 | 0.2 | 0.7 | 0.4 | 0.3 | 0.4 |
| Burnish (white paint) | Initial 85° (average) | 0.8 | | | | | 0.6 |
| | Final 85° (average) | 2.0 | | | | | 1.2 |
| | % 85° increase | 150 | | | | | 100 |

Example 18

A split (representative portion) of the sample functional additive used in Example 17 was incorporated into a different waterborne latex paint (PVC of 27, as previously described) and subjected to standard paint tests in comparison with a paint made using a virgin flux-calcined diatomite functional additive that is commercially available (EP Minerals MW-27). Results of the aforementioned paint tests are shown in Table 7 for MW-27 and Example 18. Despite the higher b* value for Example 18 compared to EP Minerals MW-27, the resultant white paints were fairly close in color as indicated by a ΔE* value of 0.3. The gloss and sheen values were slightly higher in comparison to the paint formulation containing EP Minerals MW-27.

Example 19

Example 19 incorporated a representative split of a sample of a functional additive produced by the process disclosed herein. The functional additive sample of Example 19 was prepared from selected spent cake (containing diatom frustules) that was used in the manufacture of biodiesel products. The spent cake sample was initially treated to recover the energy stored within the organic components, via gasification (recovering energy step), and then was further processed by by thermally treating a gasification ash (20 minutes at 1038° C.), then removing a coarse fraction using a Comex ACX-50 classifier (classifying). As can be seen in Table 7, in comparison to Example 18, the sample used in Example 19 had a slightly higher Hegman value commensurate with the finer particle size distribution. Here, the higher Hegman product exhibited a higher contrast ratio, 85° sheen, and ΔE* relative to the control sample (EP Minerals MW-27).

TABLE 7

Exemplary Paint Test Results

| | Sample | MW-27 Control (2A0917F) | Example 18 | Example 19 |
|---|---|---|---|---|
| | Functional Additive Source | | Split of sample used in Example 17 | |
| | Optical Properties | | | |
| Functional Additive analysis | Y | 93.2 | 82.6 | 81.6 |
| | L* | 97.3 | 92.8 | 92.4 |
| | a* | −0.1 | 0.1 | 0.0 |
| | b* | 1.4 | 3.9 | 3.1 |
| | Particle Size Distribution | | | |
| | d10 (μm) | 7.4 | 12.0 | 8.2 |
| | d50 (μm) | 14.3 | 24.1 | 16.1 |
| | d90 (μm) | 28.6 | 43.3 | 30.8 |
| | d99 (μm) | 62.0 | 83.0 | 58.0 |
| | GCOA (%) | 143 | 140 | 135 |
| | Hegman | 2.0 | 2.0 | 3.0 |
| | CWD (g/ml) | 0.38 | 0.37 | 0.38 |
| (White) Paint analysis | Y | 89.6 | 89.1 | 85.9 |
| | Contrast Ratio | 0.94 | 0.92 | 0.97 |
| | L* | 95.8 | 95.6 | 94.3 |
| | a* | −0.4 | −0.4 | −0.3 |
| | b* | 0.2 | 0.4 | 0.1 |
| | ΔL* vs MW-27 | 0.0 | −0.2 | −1.5 |
| | Δa* vs MW-27 | 0.0 | 0.0 | 0.1 |
| | Δb* vs MW-27 | 0.0 | 0.2 | −0.1 |
| | ΔE* vs MW-27 | 0.0 | 0.3 | 1.5 |
| | Gloss 60° | 15.7 | 19.0 | 13.3 |
| | Sheen 85° | 14.4 | 14.7 | 16.6 |

Example 20

In another example (Example 20), a split of the same sample used for Example 17 and for Example 18 was used in a slightly modified formulation (as compared to that which was used for Example 18). For Example 20, the amount of DE added to the white paint was reduced by half, by weight, thereby reducing the PVC to 25. The reduction in DE allowed for a higher sheen (equal to 33.0) and contrast ratio (0.96) to be achieved (Table 8) in comparison to Example 18 (Table 7).

TABLE 8

Exemplary Paint Test Results

| | Sample | Example 20 |
|---|---|---|
| | Functional Additive Source | Split of sample used in Example 17 |
| | Optical Properties | |
| Functional Additive analysis | Y | 82.6 |
| | L* | 92.8 |
| | a* | 0.1 |
| | b* | 3.9 |
| | Particle Size Distribution | |
| | d10 (μm) | 12 |
| | d50 (μm) | 24.1 |
| | d90 (μm) | 43.3 |
| | d99 (μ2) | 83.0 |
| | Hegman | 2.0 |
| | CWD (g/ml) | 0.37 |
| (White) Paint analysis | Y | 90.4 |
| | Contrast Ratio | 0.96 |
| | L* | 96.0 |
| | a* | −0.3 |
| | b* | 0.5 |
| | Gloss 60° | 22.3 |
| | Sheen 85° | 33.0 |

INDUSTRIAL APPLICABILITY

By re-using spent cake as described above, periodic supply shortages of flux-calcined functional additives comprising DE can be alleviated. In addition, by producing a high value by-product from the diatomite based filtration process, the overall cost of providing both the filtration and the functional additive materials will be reduced. There are also further economic benefits, in that diatomite mines are often located in remote locations, which can be far from population and industrial centers, whereas filtration operations and factories that use filtration products comprising diatomite are often located closer to other industrial facilities than to diatomite mines and plants. As a result, the transportation costs to factories (such as those producing coatings (e.g., paints (or the like), plastic films, or elastomers) from likely future regeneration sites will, in many cases, be lower than from diatomite mines and plants, which will further reduce the overall cost to users.

There is a need for regeneration processes which can convert spent cake comprising diatomite into higher value secondary applications and, when appropriate, which also recover energy from high calorific liquids or solids that are sometimes contained in spent filter cakes.

Also disclosed herein is a method for manufacturing a product, the method comprising: selecting spent cake that includes diatom frustules; drying the spent cake; thermally treating the spent cake to produce reclaimed diatom frustules, the thermal treatment free of gasification or pyrolysis; and optionally, classifying the reclaimed diatom frustules, wherein the product comprises at least a portion of the reclaimed diatom frustules, wherein further the product has a d90 of 25 µm to 50 µm, and an L* brightness value of at least 91.

Also disclosed herein is a method for manufacturing a (functional additive) product, the method comprising: selecting spent cake that includes diatom frustules; recovering energy from the spent cake through gasification or pyrolysis; thermally treating spent cake ash that results from the recovering to produce reclaimed diatom frustules; and classifying the reclaimed diatom frustules, wherein the product comprises at least a portion of the reclaimed diatom frustules, wherein further the product has a d90 of 25 µm to 50 µm, and an L* brightness value of at least 91.

Tables 3-4 and 6-8 illustrate exemplary functional additive products and Table 5 illustrates exemplary filter aid by-products. Although Table 3 illustrates functional additive products generated from spent cake associated with the production of sweeteners (corn syrup, and maltodextrin), and Table 4, example 17 and Tables 7-8 illustrate functional additive products generated from spent cake associated with the production of biodiesel, the spent cake used to generate the products disclosed herein may also be sourced from filtration of a fermented beverage, other sweetener(s), an edible oil, a biodiesel or the like, a lube oil, an amino acid, an antibiotic, a chemical, or a lubricant (for example, a lubricant used to aid the rolling of steel or the rolling of aluminum during production), or other comparable or like liquids. In any one of the spent cake above, the net calorific content may be 100 kcal/kg or more. Preferably, the net calorific content is 450 kcal/kg or more. More preferably, the net calorific content is 3000 kcal/kg or more; 4000 kcal/kg or more; 5000 kcal/kg or more; 6000 kcal/kg or more or 7000 kcal/kg or more; or 10,000 kcal/kg.

Furthermore, any of the functional additive products disclosed herein may be used as a flatting additive in the manufacture of paint, an opacity additive in the manufacture of paint, an anti-block additive in the manufacture of plastic film, or as a filler or functional additive in the manufacture of an elastomer. In addition, the by-product of the process disclosed herein may be used as a filter aid (or as a filter medium) for use in filtering liquids. Also disclosed herein are coatings (for example, paint), plastic films, and elastomers, each of which may comprise any of the functional additive product embodiments disclosed herein. For example, disclosed herein is a coating, plastic film, or elastomer, each comprising a functional additive (product), the functional additive including diatom frustules reclaimed from a filtration waste stream, wherein the functional additive has a d90 of 25 µm to 50 µm, and an L* brightness value of 90 to 100. In a refinement, the L* brightness value may be 91 to 100. In any of the embodiments disclosed herein, the functional additive may be in powder form.

Disclosed herein are products comprising a functional additive that includes diatomite previously used as a filtration medium; such products may be coatings, plastic films or elastomers. In an embodiment, such a product may be a coating that has an L* brightness value of at least 90. In some embodiments, the product may be a wet coating that includes waterborne latex.

In any one of the embodiments in which the product is a coating, the coating may have a contrast ratio of 0.80-1.00; or a contrast ratio of 0.80 to 0.95. In any one of the embodiments in which the product is a coating, the 85° sheen of the coating may be no more than 35, or no more than 33, or no more than 17, or no more than 15.

In any one of the embodiments in which the product is a coating, the percent gloss increase in 85° sheen from burnish testing may be no more than 150%, preferably no more than 100%. In any one of the embodiments in which the product is a coating, the coating may not fail a scrub resistance test before 800 cycles.

The product (e.g., coatings, plastic films or elastomers) may comprise 0.1 wt % up to 20 wt % of a functional additive that comprises diatom frustules reclaimed from a filtration waste stream, the functional additive having a d90 of 25 µm to 50 µm and an L* brightness value of at least 91. In a refinement, the product may comprise 0.1 wt % to 15 wt % of the functional additive that comprises diatom frustules reclaimed from a filtration waste stream. In a further refinement, the product may comprise 0.1 wt % to 10 wt % of the functional additive that comprises diatom frustules reclaimed from a filtration waste stream.

Any one of the products discussed above may be free of diatom frustules that have not been reclaimed from a filtration waste stream.

Such a product may be a first coating that when compared to a second coating has a ΔE* of 0.0 to 0.85; the second coating free of an additive product that comprises diatom frustules reclaimed from a filtration waste stream and has a d90 of 25 µm to 50 µm and an L* brightness value of at least 91. In a refinement, the first coating when compared to the second coating may have a ΔE* of 0.0 to 0.7, or 0.0 to 0.4.

Also disclosed herein is a filter aid that comprises reclaimed diatom frustules previously used in filtration, the filter aid free of unreclaimed diatomite or unreclaimed diatom frustules.

What is claimed is:

1. A product comprising diatom frustules reclaimed from a filtration waste stream comprising a spent cake, wherein the product has a d90 of 25 µm to 50 µm, and an L* brightness value of at least 91, wherein the product is produced by a method comprising:
    (1) selecting the spent cake such that it includes the diatom frustules; and
    (2) thermally treating the spent cake to produce reclaimed diatom frustules; and wherein the product is free of diatom frustules that have not been reclaimed from a filtration waste stream.

2. The product of claim 1, in which the L* brightness value of the product is at least 94.3.

3. The product of claim 1, wherein the product also has a b* value of no more than 6.2.

4. The product of claim 1, wherein the product also has a b* value of 2.3 to 3.4.

5. The product of claim 1, wherein the d90 is from 25 µm to 45.2 µm.

6. The product of claim 1, wherein the product also has a Hegman value of 0.5 to 4.

7. The product of claim 1, wherein the product also has a centrifuged wet density of 0.3 g/ml to 0.5 g/ml.

8. A coating, plastic film, or elastomer comprising the product of claim 1.

9. A method for manufacturing a product, the method comprising:
- selecting spent cake that includes diatom frustules;
- drying the spent cake;
- thermally treating the spent cake to produce reclaimed diatom frustules, the thermal treatment free of gasification or pyrolysis; and
- optionally, classifying the reclaimed diatom frustules, to form a product,
- wherein the product comprises at least a portion of the reclaimed diatom frustules, wherein the product has a d90 of 25 µm to 50 µm and an L* brightness value of at least 91, wherein the product is free of diatom frustules that have not been reclaimed from a filtration waste stream.

10. The method of claim 9, wherein, during the thermally treating, the heat contact time for the spent cake is 10 minutes to 40 minutes.

11. The method of claim 9 further comprising adding, during or prior to the thermally treating, a chemical to the spent cake.

12. The method of claim 11, wherein the chemical comprises potassium hydroxide.

13. A method for manufacturing a product, the method comprising:
- selecting spent cake that includes diatom frustules;
- recovering energy from the spent cake through gasification to obtain a spent cake ash;
- thermally treating spent cake ash that results from the recovering to produce reclaimed diatom frustules; and
- classifying the reclaimed diatom frustules, wherein the product comprises least a portion of the reclaimed diatom frustules to form a product, wherein the product has a d90 of 25 µm to 50 µm and an L* brightness value of at least 91, wherein the product is free of diatom frustules that have not been reclaimed from a filtration waste stream.

14. The method of claim 13, wherein the thermally treating is conducted at a temperature range of 900° C. to 1100° C.

15. The method of claim 13, wherein, during the thermally treating, the heat contact time for the spent cake is 1 minute to 40 minutes.

16. The method of claim 13 further comprising: adding, during or prior to the thermally treating, a chemical to the spent cake.

17. The method of claim 16, wherein the chemical comprises potassium hydroxide.

* * * * *

UNITED STATES PATENT AND TRADEMARK OFFICE
CERTIFICATE OF CORRECTION

| | |
|---|---|
| PATENT NO. | : 11,565,940 B2 |
| APPLICATION NO. | : 16/636418 |
| DATED | : January 31, 2023 |
| INVENTOR(S) | : Scott Kevin Palm et al. |

It is certified that error appears in the above-identified patent and that said Letters Patent is hereby corrected as shown below:

In the Claims

Column 30, Line 8, Claim 13, after "comprises" insert -- at --

Signed and Sealed this
Seventeenth Day of October, 2023

Katherine Kelly Vidal
*Director of the United States Patent and Trademark Office*